(12) United States Patent
Richard

(10) Patent No.: US 10,416,977 B2
(45) Date of Patent: Sep. 17, 2019

(54) AUTOMATED APPLICATION INSTALLATION ON MEDIA PLAYERS AND OTHER CONTROLLED DEVICES

(71) Applicant: SLING MEDIA INC., Foster City, CA (US)

(72) Inventor: Stephane Richard, San Francisco, CA (US)

(73) Assignee: SLING MEDIA LLC, Foster City, CA (US)

( * ) Notice: Subject to any disclaimer, the term of this patent is extended or adjusted under 35 U.S.C. 154(b) by 0 days.

(21) Appl. No.: 14/983,137

(22) Filed: Dec. 29, 2015

(65) Prior Publication Data

US 2016/0188311 A1 Jun. 30, 2016

Related U.S. Application Data

(60) Provisional application No. 62/098,102, filed on Dec. 30, 2014.

(51) Int. Cl.
| G06F 9/445 | (2006.01) |
| G06F 8/61 | (2018.01) |
| H04L 29/08 | (2006.01) |
| G06F 8/65 | (2018.01) |
| H04L 29/06 | (2006.01) |

(52) U.S. Cl.
CPC ............... G06F 8/61 (2013.01); G06F 8/65 (2013.01); H04L 67/34 (2013.01); H04L 29/06476 (2013.01); H04L 65/4084 (2013.01)

(58) Field of Classification Search
CPC ....... G06F 8/61; G06F 8/65; H04L 29/06476; H04L 65/4084; H04L 67/34

USPC .................................................. 717/174–178
See application file for complete search history.

(56) References Cited

U.S. PATENT DOCUMENTS

| 8,041,988 | B2 | 10/2011 | Tarra et al. | |
| 8,966,101 | B2 | 2/2015 | Thiyagarajan | |
| 2002/0099783 | A1* | 7/2002 | Mizuyama | G06F 9/4443 709/208 |
| 2006/0031828 | A1 | 2/2006 | Won et al. | |
| 2009/0126028 | A1* | 5/2009 | Traenkenschuh | G06F 21/572 726/30 |
| 2009/0193410 | A1* | 7/2009 | Arthursson | G06F 9/45504 717/173 |
| 2010/0293541 | A1* | 11/2010 | Pall | G06F 8/61 717/178 |
| 2011/0035668 | A1* | 2/2011 | Thiyagarajan | H04N 5/4403 715/716 |
| 2012/0054735 | A1* | 3/2012 | Tseng | G06F 8/61 717/171 |
| 2013/0227540 | A1* | 8/2013 | Ruster | G06F 8/65 717/170 |

(Continued)

OTHER PUBLICATIONS

International Search Report and Written Opinion, International Application No. PCT/US2015/067922, dated Apr. 22, 2016.

(Continued)

*Primary Examiner* — Qing Chen
(74) *Attorney, Agent, or Firm* — Lorenz & Kopf LLP

(57) ABSTRACT

Systems, methods and devices are described to automatically install software applications on media players or other consumer-type controlled devices. A smart device such as a phone, tablet or other computer suitably acts as an intermediary to deliver applications to the controlled device.

18 Claims, 2 Drawing Sheets

(56) References Cited

U.S. PATENT DOCUMENTS

Figure 1:
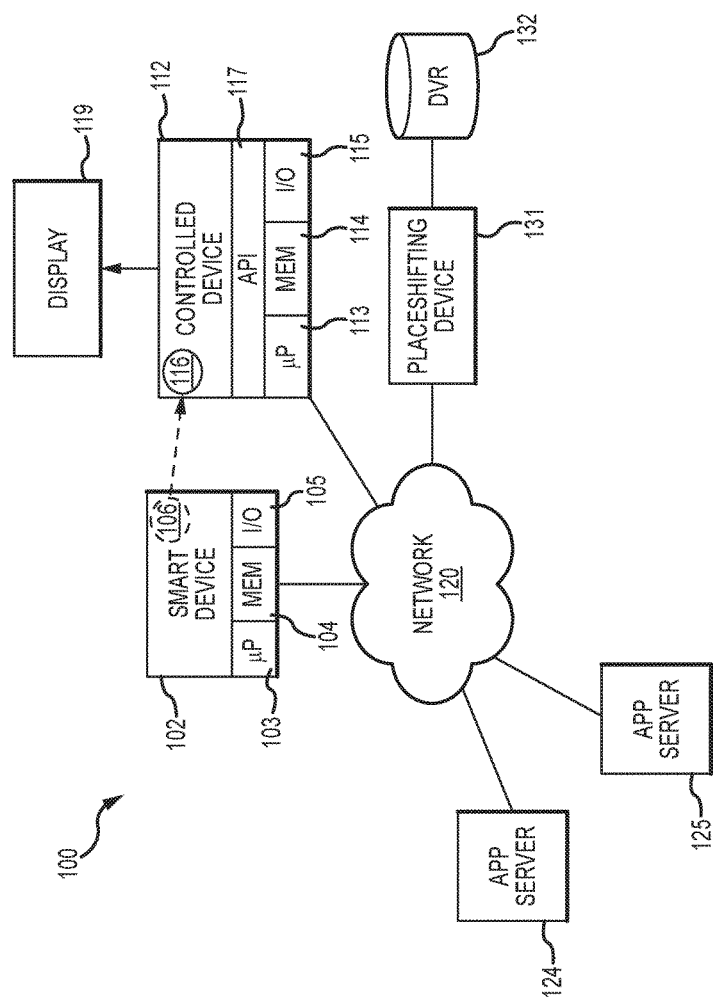

2014/0080466 A1* 3/2014 Shih .................. H04L 12/2814
　　　　　　　　　　　　　　　　　　　　　　　455/418
2014/0215457 A1　　7/2014 Gava et al.

OTHER PUBLICATIONS

International Searching Authority, International Search Report for Patent International Application PCT/US2015/067922, dated Jul. 13, 2017.

* cited by examiner

AUTOMATED APPLICATION INSTALLATION ON MEDIA PLAYERS AND OTHER CONTROLLED DEVICES

TECHNICAL FIELD

The present disclosure generally relates to automatic installation of application software on media players and other controlled devices.

BACKGROUND

Smart phones, tablets and other "smart devices" are becoming increasingly ubiquitous, and increasingly powerful. Many consumers carry smart devices with them at most (if not all) times, and many new applications continue to be developed for these devices. Recently, for example, numerous applications have been created that allow the user's phone, tablet, computer or other smart device to control other components, such as home entertainment devices. In such cases, a smart device generally executes a software application that allows the user to control a media player, set top box, digital video recorder, placeshifting device, television, video game player and/or any number of other devices.

Generally speaking, it is relatively easy to provide new software to the user's phone, tablet or other smart device through an app store or the like. Installing new software on a controlled device such as a media player, however, can be more difficult due to the more specific nature of home electronics and the desire to maintain robust and secure software on the controlled device. If a user already owns a media player device, for example, it can be a challenge to install appropriate software on the media player to add new functionality after the media player has already been sold and installed at the user's premises.

Traditionally, users installed new applications by directly interacting with the user interface of the controlled device itself. That is, a user would typically interact with an app store, web site or the like to obtain and download new applications. Alternatively, the device itself would obtain a new software or firmware version that might provide new features. Manually installing a software application on a media player or other controlled device, however, can be cumbersome to some users. Moreover, many users will simply not take the effort to learn about new applications or to download newly-discovered applications. While a firmware update can be less obtrusive, it may not be desirable to include optional features (such as those often found in many applications) within a firmware update that is typically sent globally to all devices currently in operation.

It is therefore desirable to create systems, devices and processes to efficiently and effectively install new applications that can facilitate new functionalities on media players and other controlled devices. These and other desirable features and characteristics will become apparent from the subsequent detailed description and the appended claims, taken in conjunction with the accompanying drawings and this background section.

BRIEF SUMMARY

The following discussion generally relates to automatic installation of application software on media players and other controlled devices.

Some example embodiments provide computer-implemented processes executable by processors of a smart devices to automatically install applications in controlled devices. In these examples, the computer-implemented process suitably comprises discovering the controlled device in communication with the smart device; determining whether the application is present on the controlled device; and, in response to determining that the application is not present on the discovered controlled device, providing an instruction from the smart device to the controlled device that directs the controlled device to automatically obtain the application for installation on the controlled device, and, after the controlled device has automatically obtained and installed the application, receiving a response from the controlled device confirming that the application was installed.

Other examples provide a computer-implemented process executable by a processor of a controlled device to automatically install an application that is executable by the controlled device. The example computer-implemented process suitably comprises receiving a discovery message from a smart device; processing the discovery message by gathering information about the application; transmitting a response to the discovery message that provides the information gathered about the application to the smart device; in response to a subsequent instruction from the smart device, automatically obtaining the application for installation on the controlled device, and, after automatically obtaining and installing the application, transmitting a response to the smart device confirming that the application was installed.

Still other examples provide a media player or other consumer-type device operating as a controlled device. The consumer device suitably comprises an interface to a network, a video interface to a display, and a processor configured to execute any of the various processes described herein. In some examples, the processor executes an application program interface (API) or other software program that receives a a discovery message from a smart device; processes the discovery message by gathering information about the application; transmits a response to the discovery message that provides the information gathered about the application to the smart device; in response to a subsequent instruction from the smart device, automatically obtains the application for installation on the controlled device, and automatically installs the obtained application. After automatically obtaining and installing the application, various embodiments transmit a response to the smart device confirming that the application was installed.

Various further embodiments relate to systems or devices that automatically install software using the techniques and processes described herein, as well as smart devices that interact with such controlled systems. Other embodiments relate to computer-implemented processes or methods to automatically install software applications in consumer or other devices.

In various embodiments, the controlled device is a consumer-type media player or the like, and the application is a placeshifting client application that allows media streams to be placeshifted from a placeshifting device to the controlled device in response to user instructions received from the smart device. Other embodiments may be used in any number of other applications and settings.

Additional embodiments could provide other systems, devices, remote devices, media players, software programs, encoders, processes, methods and/or the like that perform these or other functions. Various examples of embodiments, aspects and features are described in detail below.

BRIEF DESCRIPTION OF THE DRAWING FIGURES

Figure 2:
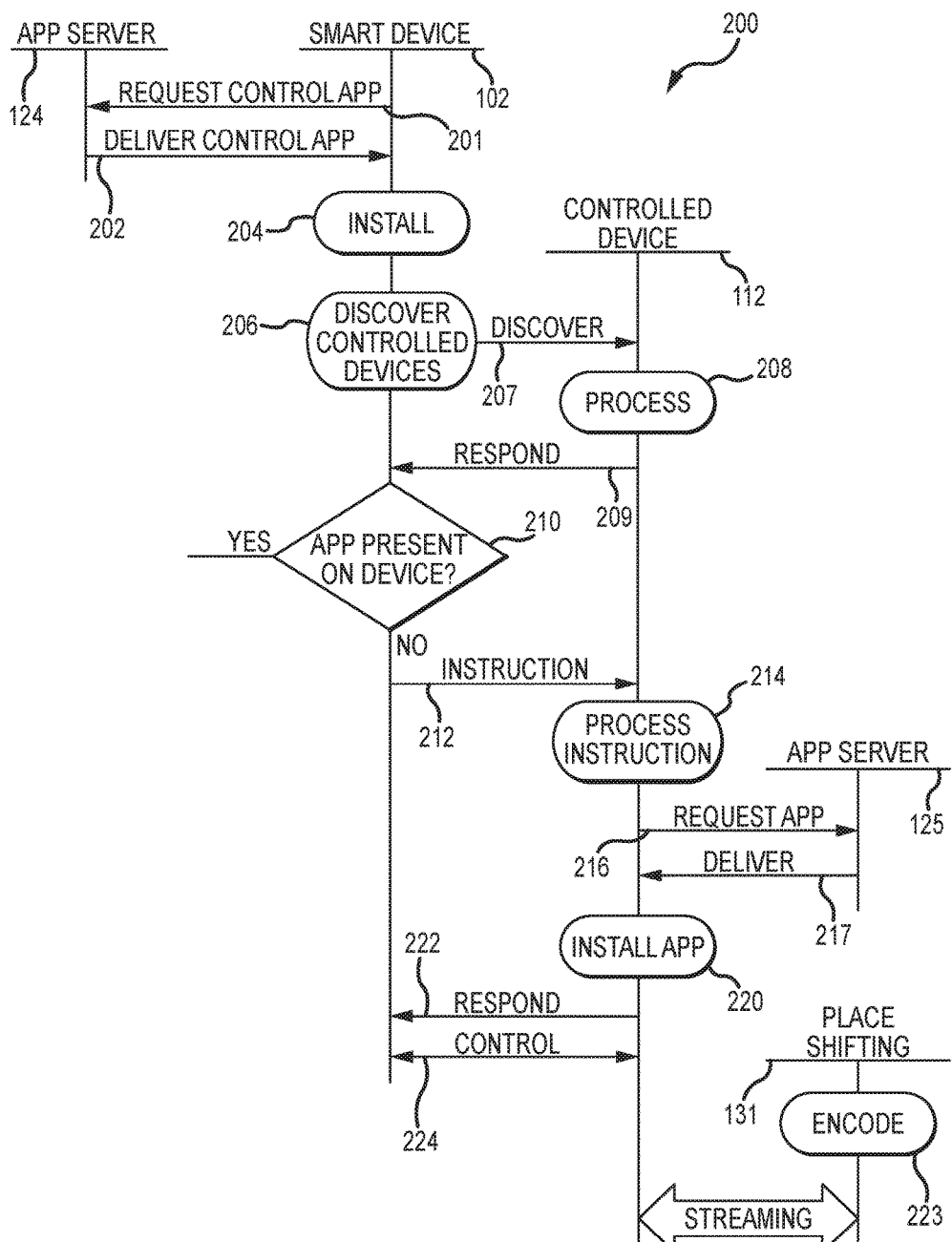

Exemplary embodiments will hereinafter be described in conjunction with the following drawing figures, wherein like numerals denote like elements, and FIG. 1 is a block diagram of an exemplary media player control system;

FIG. 2 is a process diagram of an exemplary process to automatically install an application on a media player or other controlled device.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Application software may be automatically provided to a media player or other device to allow the receiving device to perform new functions, such as playing streaming media in new formats or from new sources. Some implementations could use the techniques, systems and devices described herein to streamline the installation of application software on a media player to add placeshifting functionality, to add compatibility with new devices or services, to add new media client functions, and/or for any other purpose. One implementation of the concepts set forth herein could be used to add placeshifting compatibility (e.g., compatibility with any of the SLING BOX products available from Sling Media of Foster City, Calif.) to a media player device.

Rather than requiring a user to manually download a new application, then, various embodiments automate the software download process by using a mobile phone, tablet, computer system or other smart device as an intermediary. In various embodiments, the controlled device includes an application program interface (API) that may be downloaded through a firmware update or the like. When the API receives an appropriate code or other instruction from a compatible control device (e.g., a mobile phone), this triggers the controlled device to obtain the appropriate application. The user simply interacts with his or her smart device, so he or she does not have to take additional steps involving the interface of the controlled device itself.

Turning now to the drawing figures and with initial reference to FIG. 1, an example system 100 allows a smart device 102 to facilitate automatic installation of a new software application 116 on a controlled device 112. Generally speaking, smart device 102 downloads a control application 106 from an application store or other server 124. Control application 106 identifies compatible devices (e.g., device 112) on the network and provides a suitable instruction to an application program interface (API) 117 of controlled device 112 that prompts device 112 to obtain the appropriate application 116 from server 124, or from a separate server 125 via network 120. Equivalent embodiments may operate in any number of other ways, as described more fully herein.

As noted above, controlled device 112 is any consumer-type electronics component suitable for use in a home, office, school, laboratory or other user-controlled environment. In various embodiments, controlled device 112 is a media player device that obtains audio/visual media content from any source and that provides the content for playback to the user. A conventional media player 112 may, for example, obtain streaming media content from video-on-demand (VOD), remote storage digital video recorder (RS-DVR), file streaming and/or other sources for decoding and presentation to the user on a television or other display 119. Many brands of media player devices are currently available in the United States and elsewhere. Examples of media player devices could include, without limitation, the APPLE TV product available from Apple Computer Corp. of Cupertino, Calif.; the ROKU media players available from Roku Inc. of Saratoga, Calif.; the CHROMECAST products available from Google Inc. of Mountain View, Calif.; and/or many others. Although the discussion herein often refers to controlled device 112 as a media player or the like, equivalent embodiments could be implemented with video game players, televisions, set top boxes and other television receivers, digital video recorders, and/or any other controlled electronics devices as desired.

Controlled device 112 is typically implemented using any sort of conventional computing hardware, such as a conventional processor 113, memory 114 and input/output interfaces 115. Processor 113 may be a microprocessor, microcontroller, digital signal processor, special purpose processor, and/or the any other circuitry that is capable of executing programmed logic as described herein. In various embodiments, a software application 116 is automatically installed in controlled device 112 using the systems and techniques described herein. Application 116 may be stored in memory 114 or other mass storage associated with controlled device 112 for execution by processor 113, as appropriate. Interfaces 115 may include conventional network interfaces (e.g., a wireless or wired network interface card), as well as any interfaces for receiving user inputs (e.g., via a control panel or remote control) and providing audio/video outputs to display 119 or the like.

Smart device 102 is any sort of user-controlled computing or communications device that is capable of obtaining and executing software applications to communicate with controlled device 112. In various embodiments, smart device 102 is implemented with a conventional mobile phone, tablet, laptop or other computer system executing any sort of operating system that is available for mobile, desktop and/or embedded computing. Such devices 102 typically include conventional computing hardware such as a microprocessor 103, memory 104 and appropriate input/output interfaces 105 for establishing network communications, for receiving user inputs, and for providing appropriate audio/visual or other outputs. Input/output interfaces 105 may include, for example, network interfaces to wired or wireless networks, as well as touch-based or other input devices and/or a display screen, to provide just a few examples.

In the example illustrated in FIG. 1, system 100 includes a placeshifting device 131 that encodes content from a television receiver, digital video recorder (DVR) or other content source 132 for streaming to a client application executing on a different device. In some cases, the placeshifting client could be an application (e.g., control application 106) executing on smart device 102. In various embodiments, application 116 executing on controlled device 112 operates as a placeshifting client to receive a live-encoded media stream from placeshifting device 131. In some embodiments, placeshifting device 131 is a separate encoder device such as any of the SLINGBOX products available from Sling Media of Foster City, Calif. Other placeshifting devices 131 could include set top boxes, DVRs or other devices with placeshifting functionality integrated with a television receiver, DVR and/or other content sources 132 (e.g., the HOPPER WITH SLING set top box available from Echostar Technologies Inc. of Englewood, Colo.). Many other placeshifting devices are provided by other manufacturers and distributors, and any of these could be used in equivalent embodiments. Further, equivalent embodiments could implement similar concepts to provide other applications or features for other types of controlled devices 112, as desired.

To continue the placeshifting example, a user may wish to view content from a DVR, television tuner, media player or other content source 132 on display 119 even though content source 132 may be located in a different room or building. This can be accomplished by placeshifting the desired media content from placeshifting device 131 across network 120 to a suitable media client 116 executing on controlled device 112. To that end, placeshifting device 131 typically responds to user commands to obtain desired media content, to encode the content in real time (or even faster than real time) as it is received from the media source 132, and to transmit the encoded media stream to the media player client (e.g., controlled device 112 in this example) for playback on display 119. In many cases, user inputs for controlled device 112 are provided using application 106 executing on smart device 102. That is, smart device 102 acts as a remote control for controlled device 112. Control signals may be transmitted between smart device 102 and controlled device 112 via local area or other networks (e.g., WiFi), via other wireless connections (e.g., via ZIGBEE or BLUETOOTH protocols), via direct optical or radio frequency (RF) communications, or in any other manner. In still other cases, the user may interact directly with application 116 using any suitable interface features of controlled device 112.

If controlled device 112 has not yet installed the client application 116, however, then it may be desirable to automatically install the application 116 in a manner that is convenient and easy for the user. Installation may be automated through the use of an application program interface (API) 117 that is present on controlled device 112. API 117 may be installed as part of the system firmware, for example, or as software that is executed at system startup. API 117 may be included in a firmware or software update that is provided to legacy devices already operating in the field. API 117 may support multiple programs or control applications 106; API 117 may also provide functions or features in addition to those described herein.

API 117 is designed so that an appropriate application 106 executing on a smart device 102 is able to trigger software downloads to the controlled device 112. To that end, API 117 may include verification of digital signatures or other cryptographic codes to verify the authenticity of instructions received, or to prevent rogue programs from downloading undesired programming to device 112. In various embodiments, API 117 includes a daemon or other service that receives instructions from client programs 106, that authenticates the instructions to verify authenticity, and that executes proper instructions as appropriate. In the case of an instruction to download an application, for example, the API 117 may communicate with an appropriate service 125 that is accessible via network 120 to identify the appropriate program 116 and/or to obtain the program 116 itself. The obtained program 116 may be installed in any manner so that new functionality can be added to the controlled device 112. This process is therefore an automatic process because it does not require the user to directly use the interface of the controlled device 112 to install the program 116. In this example, installation of the program 116 is carried out by API 117 solely in response to instructions received from controlled device 102, with no further input from the user.

Servers 124 and 125 are conventional data servers operating on network 120. As used herein, server 124 is generally described as providing an application store or other download service for providing software to smart device 102, and server 125 is generally described as providing software and/or data to controlled device 112. In practice, servers 124 and 125 may be combined, separated or differently organized in any manner. Further, servers 124 and 125 may be implemented using larger data processing systems, content delivery networks (CDNs), and/or any number of other conventional features.

FIG. 2 shows an example process 200 to automatically install software applications 116 in a controlled device 112, as desired. The various functions shown in FIG. 2 may be implemented in software, firmware or other programmable logic executing in smart device 102 and/or controlled device 116, as appropriate. Application 106, for example, may be executed on processor 103 to control the various actions of smart device 102 using the functions shown in FIG. 2, while application program interface 117 can be executed on processor 113 to control the various functions of controlled device 112 shown in FIG. 2. Other embodiments may carry out the various functions of process 200 using different logic or using differently-organized logic, as desired. Communications between the smart device 102 and the controlled device 112 may take place over any sort of wired or wireless network (e.g., network 120, or any sort of local area network (LAN)), via personal area networks, via BLUETOOTH or other direct connections, via direct optical or RF connections, and/or the like.

FIG. 2 shows smart device 102 initially obtaining an application 106 from server 124 via network 120. In some implementations, application 106 may be associated with controlled device 116, with placeshifting device 131, content source 132 and/or the like. A placeshifting client 106 that typically interacts with a placeshifting device 106, for example, could be readily modified to provide automatic installation of placeshifting features for controlled device 112, as desired. In other embodiments, a control application 106 that is typically used to provide remote control or other functions with respect to controlled device 112 may be augmented to include the automatic installation features, as desired. Other applications 106 may be equivalently formulated in place of those described herein.

Typically, obtaining application 106 will involve a request 201 provided to an application store, download service 124, or the like. The service 124 returns the requested program 106 (function 202) as appropriate. Many types of smart devices (e.g., those operating the iOS, ANDROID, WINDOWS or similar operating systems) may obtain control application 106 using a application store or other conventional source for applications executable by device 102. Application 106 is installed on device 102 as appropriate (function 204); again, many conventional smart devices 102 have well-established capabilities for obtaining and installing new application programs, and most users are already familiar with such capabilities, so obtaining and installing such programs is typically relatively straightforward for most users.

When control application 106 is activated (or at any other appropriate time), various embodiments will send a discovery message 207 on a local area network to identify compatible client or server devices (function 206). In the placeshifting example described herein, the placeshifting application 106 transmits a discovery message 207 on a local area or other network 120 to discover any potentially-compatible servers (e.g., device 131) and/or clients 112. Other embodiments could transmit discovery messages 207 via other wireless protocols, such as via personal area networks, via direct wireless links (e.g., BLUETOOTH links), via direct RF or optical signals, and/or the like.

Controlled device 112 receives discovery message 207, and responds as appropriate (function 209). In various embodiments, message 207 is received via a network interface 115 and handled by a daemon or service executing as part of API 117. API 117 handles the received request 207 as appropriate (function 208) to formulate a suitable response 209. In various embodiments, handling 208 may include gathering information about the resources or capabilities of device 112 to report back to requesting application 106. Gathered information may include whether or not the device 112 currently has a particular application 116 installed. In various embodiments, some or all of the interactions between application 106 and controlled device 112 may be in accordance with the DIscovery And Launch (DIAL) protocol or the like. Alternate embodiments could equivalently use multicast Domain Name Services (mDNS) protocols described by Internet RFC 6762, and/or any other open or proprietary protocols as desired.

If the application 116 is already present on device 112 (function 210), then it will not typically be necessary to re-install the application. If the application becomes outdated or corrupt, however, then the current version that is installed on device 112 may be deleted, archived or otherwise replaced by the controlled device 112 in response to an instruction from smart device 102 directing the controlled device 112 to take the appropriate archive, delete or other actions. Functions 212-222 may then be used to replace the outdated application 116 as desired.

Automatic software downloading by device 112 is triggered by an instruction 212 that is sent from application 106 to API 117. In various embodiments, the instruction 212 includes an encrypted or otherwise secure code that ensures that the instruction 212 is valid. The secure code could include, for example, a digital signature from a source that is trusted by device 112. Instruction 212 might also include a uniform resource locator (URL) or other code that identifies the particular program 116 to be obtained, and/or a source 125 for the desired program 116. In other embodiments, the identity of program 116 and/or source 125 is "hardcoded" in API 117 to prevent malicious instructions that could otherwise install undesired programs from undesired sources.

API 117 processes instruction 212 as appropriate (function 214). In various embodiments, API 117 will verify the digital signature or other authentication credentials contained in the instruction 212 by consulting with service 125 or the like via network 120. If the credentials are approved, then the appropriate program 116 is requested (function 216) and received (function 217) from network service 125 or another source. API 117 then controls the installation of the received software program 116 as appropriate (function 220). The installation is automatic in the sense that the user does not need to directly interact with the controlled device 112; the software download is initiated using the application 106 on the user's smart device, and may occur either with or without the user's knowledge. Although the user may be prompted by application 106 to approve the download of application 116 in some cases, this is not necessary in all embodiments. Similarly, some devices 112 may notify the user that new software 116 has been installed and/or to approve the installation of new software on device 112, even though the installation takes place automatically.

After the application 116 is installed, the device 112 notifies application 106 (function 222) and operation continues as normal. Application 106 may act as a remote control for device 112 and/or placeshifting device 131, for example (function 224) using commands based upon user inputs received at the smart device 102 that are sent over network 120 and/or any other network, including any sort of local area wireless network (WLAN). To continue the placeshifting example above, application 106 could establish a placeshifting session 226 in which placeshifting device 131 obtains content of interest to the user and encodes the content in real time (or faster than real time) 223 into a media stream 225 that is transported over network 120 to controlled device 112. In this example, device 112 executes a placeshifting client application 116 that was automatically downloaded to decode the received stream and to render the decoded content for playback to the user on display 119. In some embodiments, application 106 may act as a control application that provides user inputs received at the smart device 102 (e.g., commands to select programs for viewing, to play/pause/fast forward/rewind, or to take other actions) to control the placeshifted media stream or playback to the user.

Even though application 106 provides the trigger instruction 212 to initiate automatic installation of application 116 in this example, in many embodiments application 116 is able to operate independently from control application 106. That is, in some embodiments application 116 may respond to the user interface of device 112 to provide desired features even when control application 106 is not present.

As noted above, the various concepts, processes, systems and devices described herein may be used in any number of different environments. Any type of application, applet, program module or other software may be automatically installed on any type of media player or other controlled device 112 to implement any desired function, as desired. The general concepts described herein are readily adaptable to any number of alternate but equivalent embodiments.

The term "exemplary" is used herein to represent one example, instance or illustration that may have any number of alternates. Any implementation described herein as "exemplary" is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A computer-implemented process executable by a processor of a smart device to automatically install an application in a controlled device, the computer-implemented process comprising:

discovering the controlled device in communication with the smart device;

determining whether the application is present on the discovered controlled device; and in response to determining that the application is not present on the discovered controlled device, providing an instruction from the smart device to the discovered controlled device that directs the discovered controlled device to automatically obtain the application for installation on the discovered controlled device, and, after the discovered controlled device has automatically obtained and installed the application, receiving a response from the discovered controlled device confirming that the application was installed, wherein the instruction provided by the smart device comprises a digital signature that is verifiable by the discovered controlled device prior to the discovered controlled device automatically obtaining the application to ensure that the instruction provided by the smart device is valid, wherein the discovered controlled device automatically validates the digital signature by consulting a digital signature validation service on a computer network, and wherein an identity of the digital signature validation service on the computer network is hardcoded within an application program interface (API) present on the discovered controlled device prior to the smart device discovering the discovered controlled device.

2. The computer-implemented process of claim 1 wherein the discovered controlled device automatically installs the application without direct input from a user of the discovered controlled device.

3. The computer-implemented process of claim 1 wherein the discovering comprises transmitting a discover message on the computer network and receiving a response to the discover message from the discovered controlled device via the computer network.

4. The computer-implemented process of claim 3 wherein the response to the discover message comprises information gathered by the discovered controlled device indicating whether the application is present on the discovered controlled device.

5. The computer-implemented process of claim 1 wherein the instruction provided by the smart device to the discovered controlled device comprises a code that identifies the application and a source for the application.

6. The computer-implemented process of claim 5 wherein the code comprises a uniform resource locator (URL).

7. The computer-implemented process of claim 1 wherein the determining comprises determining whether an outdated version of the application is present on the discovered controlled device, and, if so, instructing the discovered controlled device to replace the outdated version of the application.

8. The computer-implemented process of claim 1 wherein the discovered controlled device obtains the application from a server source on the computer network, and wherein the server source is different from the smart device.

9. The computer-implemented process of claim 8 wherein the server source on the computer network is identified by a code contained in the instruction from the smart device.

10. The computer-implemented process of claim 1 wherein the discovered controlled device is a consumer-type media player, and wherein the application is a placeshifting client application that allows media streams to be placeshifted from a placeshifting device to the discovered controlled device in response to user instructions received from the smart device.

11. The computer-implemented process of claim 1 wherein the identity of the digital signature validation service on the computer network that is hardcoded within the API present on the discovered controlled device comprises an address of the digital signature validation service on the computer network.

12. A computer-implemented process executable by a processor of a controlled device to automatically install an application that is executable by the controlled device, the computer-implemented process comprising:

receiving a discovery message from a smart device;
processing the discovery message by gathering information about the application;
transmitting a response to the discovery message that provides the information gathered about the application to the smart device;
in response to a subsequent instruction from the smart device that comprises a digital signature identifying the smart device, the processor of the controlled device automatically validating the digital signature by consulting a digital signature validation service on a computer network to ensure that the subsequent instruction from the smart device is valid, wherein an identity of the digital signature validation service on the computer network is hardcoded within an application program interface (API) present on the controlled device prior to receiving the discovery message from the smart device; and
if the digital signature is valid, the processor of the controlled device automatically obtaining the application for installation on the controlled device, and, after automatically obtaining and installing the application on the controlled device, transmitting a response to the smart device confirming that the application was installed on the controlled device.

13. The computer-implemented process of claim 12 wherein the controlled device automatically installs the application without direct input from a user of the controlled device.

14. The computer-implemented process of claim 12 wherein the identity of the digital signature validation service on the computer network that is hardcoded within the API present on the controlled device comprises an address of the digital signature validation service on the computer network.

15. A consumer device that executes an application to play back media streams on a display, the consumer device comprising:

an interface communicatively coupled to a computer network;
a video interface communicatively coupled to the display; and
a processor configured to execute a process that receives a discovery message from a smart device via the computer network; processes the discovery message by gathering information about the application that plays back the media streams; transmits a response to the discovery message via the computer network that provides the information gathered about the application to the smart device; in response to a subsequent instruction from the smart device via the computer network that comprises a digital signature, automatically validates the digital signature by consulting a digital signature validation service on the computer network, wherein an identity of the digital signature validation service on the computer network is hardcoded within an application program interface (API) present on the consumer device prior to the smart device discovering the consumer device and, if the digital signature validation service indicates that the digital signature is valid, obtains the application for installation on the consumer device, and automatically installs the obtained application on the consumer device.

16. The consumer device of claim 15 wherein the processor is further configured to transmit a response to the smart device confirming that the application was installed.

17. The consumer device of claim 15 wherein the consumer device is a consumer-type media player, and wherein the application is a placeshifting client application that allows media streams to be placeshifted from a placeshifting device to the consumer device in response to user instructions received from the smart device.

18. The consumer device of claim 15 wherein the identity of the digital signature validation service on the computer network that is hardcoded within the API present on the consumer device comprises an address of the digital signature validation service on the computer network.

* * * * *